United States Patent [19]
Hartmeyer et al.

[11] Patent Number: 5,492,363
[45] Date of Patent: Feb. 20, 1996

[54] FLOW REGULATING AIR BAG VALVE

[75] Inventors: James Hartmeyer, St. Clair Shore; John J. Jakovski, Warren, both of Mich.

[73] Assignee: Takata, Inc., Auburn Hills, Mich.

[21] Appl. No.: 301,672

[22] Filed: Sep. 7, 1994

[51] Int. Cl.[6] .................................................. B60R 21/30
[52] U.S. Cl. ........................ 280/739; 280/738; 280/742
[58] Field of Search .............................. 280/728 R, 736, 280/738, 739, 740, 742, 743 A

[56] References Cited

U.S. PATENT DOCUMENTS

| Re. 34,204 | 3/1993 | Takada | 280/736 |
|---|---|---|---|
| 3,527,475 | 9/1970 | Carey et al. | 280/738 |
| 3,733,091 | 5/1973 | Fleck et al. | 280/739 |
| 3,820,814 | 6/1974 | Allgaier et al. | 280/239 |
| 3,887,213 | 6/1975 | Goetz | 280/738 |
| 4,097,065 | 6/1978 | Okada et al. | 280/739 |
| 4,111,458 | 9/1978 | Okada et al. | 280/739 |
| 4,181,325 | 1/1980 | Barnett | 280/739 |
| 4,805,930 | 2/1989 | Takada | 280/739 |
| 5,016,913 | 5/1991 | Nakajima et al. | 280/738 |
| 5,018,761 | 5/1991 | Henseler | 280/730 R |
| 5,071,161 | 12/1991 | Mahon et al. | 280/739 |
| 5,246,250 | 9/1993 | Wolanin et al. | 280/739 |
| 5,362,101 | 11/1994 | Sugiura et al. | 280/743 A |

FOREIGN PATENT DOCUMENTS

| 2302622 | 8/1973 | Germany | 280/738 |
|---|---|---|---|

*Primary Examiner*—Margaret A. Focarino
*Assistant Examiner*—Christopher Ellis
*Attorney, Agent, or Firm*—Harness, Dickey & Pierce

[57] ABSTRACT

An improved air cushion restraint system utilizes a gas flow-regulating valve having an inner membrane, an outer membrane, a pucker formed therebetween, and a flow passage from the air bag inflation chamber to the pucker for expulsion through an outer membrane aperture. The inner membrane is extensible in response to occupant impact with the air bag which exceeds a threshold value such that the inner membrane extends in response to such load where it is brought into nested engagement with the outer membrane pucker which flow restricts the aperture and stiffens the air bag.

18 Claims, 4 Drawing Sheets

5,492,363

FLOW REGULATING AIR BAG VALVE

FIELD OF THE INVENTION

This invention relates generally to inflatable motor vehicle occupant restraint systems, and more particularly to devices for controlling inflation and deflation of a vehicle air cushion.

BACKGROUND OF THE INVENTION

Previously, many features have been provided on inflatable vehicle occupant restraint systems for controlling inflation and deflation of an air bag. Some of these devices incorporate porous fabric panels in the construction of an air bag, while others incorporate gas generating inflators which tailor delivery of inflation gases into an air bag. Alternatively, or in combination, air vents are provided in air bags for expelling inflation gases from within an inflating or deflating air bag.

Frequently, vents have been provided in air bags to expel excess exhaust gases from within a bag which can cause over pressurization or failure of the bag as a result of an occupant impact with the bag during a vehicle collision. Typically, excess inflation gases are provided within an air bag in order to enhance the speed with which an air bag is inflated in order to assure the full deployment an air bag in a timely manner for presentation to a forward moving occupant during a vehicle crash. However, these excess gases must be vented from within the bag subsequent to full deployment in order to present a compliant air bag to the occupant which has a reduced stiffness during impact. Moreover, most air bag vents which provide variable air flow are designed to restrict the venting of gases during inflation and before an occupant impacts the air bag, and increase gas venting once the occupant impacts the bag.

U.S. Pat. No. 3,820,814 discloses a discharge valve for an air bag which provides a more tailored discharge of exhaust gases through an aperture. A cup-shaped housing is provided in the walls of the air bag which has an aperture for expelling exhaust gases. A flexible cover is supported upstream of the aperture by a plurality of elastic bands which vary position of the cover with respect to the aperture in order to flow restricting exhaust gases which exit through the aperture. In order to stably support and present the cover with the elastic bands, the housing must provide a rigid or semi-rigid support structure or else presentation of the cover with respect to the aperture cannot be accurately controlled and tailored. However, the incorporation of a rigid or semi-rigid housing on the surface of an air bag is a problem because a hard-spot is formed by the housing on the air bag surface which might abrade or injure an occupant, and could further contribute to occupant head injury. Contact of an occupant's head with a rigid or semi-rigid object is not desirable, and incorporation of such a valve on an air bag would require placing the valve at locations where the occupant does not make contact with the bag.

U.S. Pat. No. 5,246,250 discloses a tether-actuated valve assembly provided in an air bag which pulls a gas impermeable valve flap across a pair of flow regulating panels in order to block the flow of gas from an air bag as it approaches a full state of inflation. However, such a flow regulating device is bulky and complicated in operation, and might be unreliable. Furthermore, such a device reduces flow from an air bag which tends to restrict flow as the bag reaches a fully inflated state. It is preferable to provide a device which tailors expulsion of inflation gases from an air bag based on pressure within the bag. For example, such a desired air bag would decrease the exhausting of inflation gases from a bag when the bag exceeds a threshold pressure due to impact by a large occupant or a high energy impact resulting from a high speed collision in order to prevent bottoming out of the air bag by an occupant.

SUMMARY OF THE INVENTION

In accordance with this invention, a flexible membrane air bag with provision for mounting to a pressurized gas inflation source has a gas flow-regulating valve with an inner and outer membrane which partially or completely closes in response to increases in internal air bag pressure. The inner and outer membranes are joined together and a pucker is formed in the outer membrane with at least one fluid flow aperture for expelling inflation gases from the air bag such that the inner membrane is separated from the outer membrane by a gap in the region of the pucker. Preferably, the pucker extends beyond the inner membrane to provide a fluid flow path for delivering inflation gases from within the bag into the pucker where it is expelled through the aperture. The inner membrane is provided with a load extensible portion such that at a predetermined load the inner membrane is extended which presents the inner and outer membranes in a nested configuration to reduce or eliminate flow through the aperture.

Thus, provision of one or more flow apertures in the outer membrane in combination with appropriate load triggerable and extensible portions on the inner membrane provides for a tailored reduction of exhaust gas expulsion from the air bag which tailors the stiffness of the bag. For example, an air bag can be designed which has either perforations or an orifice for continuously expelling inflation gases in combination with a flow-regulating valve of this invention which cooperates therewith to stiffen the air bag when stresses on the inner membrane of the valve exceed a predetermined level, for example when a large occupant impacts the bag, in order to prevent bottoming out of the bag by the impacting occupant.

Preferably, a single flow aperture is provided in the outer membrane of the valve, and a pucker is formed from the outer membrane by sewing the inner membrane at selected locations to the outer membrane directly beneath the aperture such that the surface dimensions of the unstressed inner and outer membranes are miss-matched. Namely, the outer membrane is larger than the inner membrane in at least one dimension between such selected locations which causes the outer membrane to pucker with respect to the inner membrane when they are sewn together. For example, the inner aperture can be formed from a rectangular patch of fabric having an energy absorbing longitudinal pucker sewn in to stretch the patch which is then sewn along a pair of opposite edges to the outer membrane which forms the air bag membrane. Flow of gases from inside the air bag enter the gap between the inner membrane and outer membrane along the free or unsewn edges of the inner membrane via the pucker where it is expelled through the flow aperture.

Preferably, inflation of the air bag alone will not produce pressures high enough to trigger closing of the valve. Furthermore, impact of a small occupant, or impact of an occupant under low speed collisions produces lower level impact energies with corresponding lower internal bag pressures which will not trigger closing of the valve through inner membrane extension and retraction of the pucker. Alternatively, the valve can be tailored to close during late inflation of the air bag which stiffens the fully presented bag for better receiving an occupant impact.

Further variations include use of a plurality of apertures in the outer membrane to progressively increase flow restriction of the valve while the inner and outer membranes nest together under pressure. Alternatively, the outer membrane can be constructed from an uncoated woven fabric with gaps formed between the weft and warp threads which define a plurality of extremely small apertures, such that the uncoated fabric is sealed upon extension of the inner membrane in nested engagement with the pucker or through concurrent dissipation of the pucker as the inner and outer membranes nest together. Likewise, the outer membrane can be provided with flow apertures and the inner membrane can be formed from an uncoated fabric which provides for restricted air flow between the weft and warp threads such that extension of the inner membrane eliminates the pucker which reduces, but does not eliminate, air flow through the outer membrane aperture.

Further objects, features and advantages of the invention will become apparent from a consideration of the following description and the appended claims when taken in connection with the accompanying drawings.

DETAILED DESCRIPTION OF THE PREFERRED EMBODIMENT

For applications where a vehicle air bag having variable impact response is needed, a bag can be constructed with a gas flow-regulating valve which reduces expulsion of gases in the bag in response to impact-induced pressure increases within the bag which stiffens the bag and prevents bottoming out of the bag by an occupant during a vehicle crash. If an air bag is desired which optimizes energy absorption for a wide range of occupants under a wide range of impact conditions, a valve of this invention can be designed to restrict flow at a desired threshold level and can be further used in conjunction with additional exhaust ports to provide an air bag having appropriate stiffness characteristics for a wide range of occupants and impact conditions.

Figure 1:
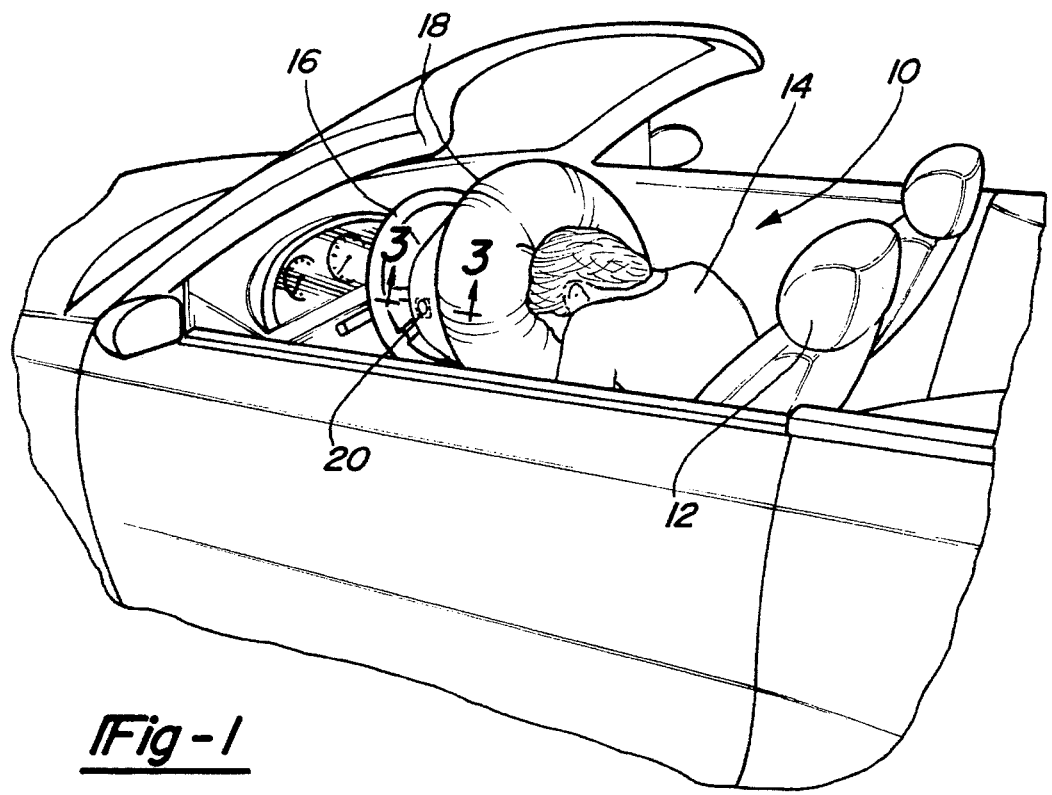
FIG. 1 is a perspective view of an automotive vehicle interior provided with a deployed improved air bag according to this invention which protects an occupant during a vehicle collision.

In accordance with this invention, FIG. 1 depicts an automotive vehicle passenger compartment 10 provided with a seat 12 which supports an occupant 14. A steering column 16 positioned directly in front of the occupant 14 supports an air bag 18 which is presented in an inflated state to restraint an occupant during a frontal vehicle crash. Provision of a gas flow-regulating valve 20 on the air bag 18 allows for tailoring of the compression characteristics of the bag in order to optimize its energy absorption characteristics under varying impact conditions. For example, a small occupant imparts smaller impact energies to the bag than does a large occupant. Likewise, low velocity vehicle impacts result in occupants impacting the air bag with corresponding lower velocities than for higher velocity vehicle impacts which produce lower impact energies. Normally, during low energy impacts an inflating bag is presented to an occupant with the same stiffness as during high energy impacts. An air bag designer must design the bag to assure the bag does not bottom out under the most severe crash conditions, namely for a large occupant under a high velocity impact. As a result, during low speed impacts small occupants will be presented with a bag which is too stiff to achieve optimal energy absorption for such impact conditions. Therefore, it is desirable to vent gases from the bag through the flow regulating valve 20 of this invention during low energy impact conditions, and to restrict the flow under high energy impact conditions.

Figure 2:
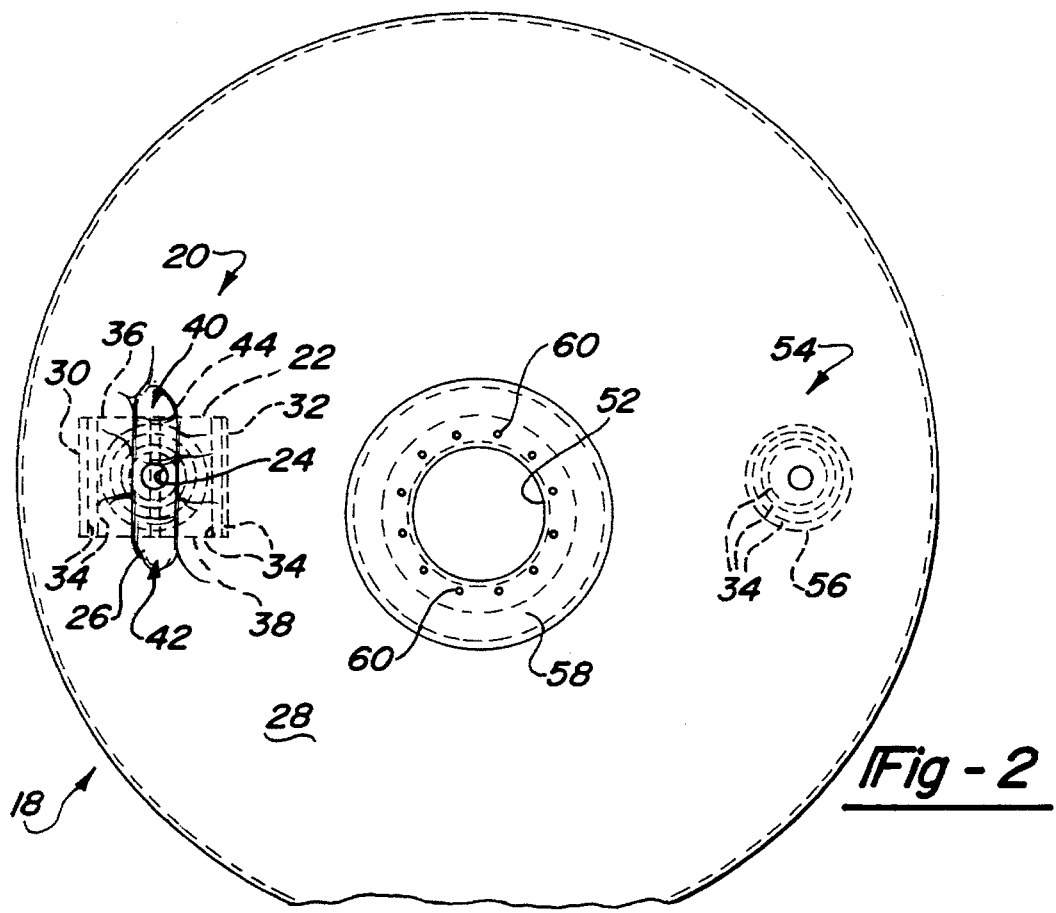
FIG. 2 is a plan view of an improved air bag according to this invention with a flow regulating valve.
Figure 3:
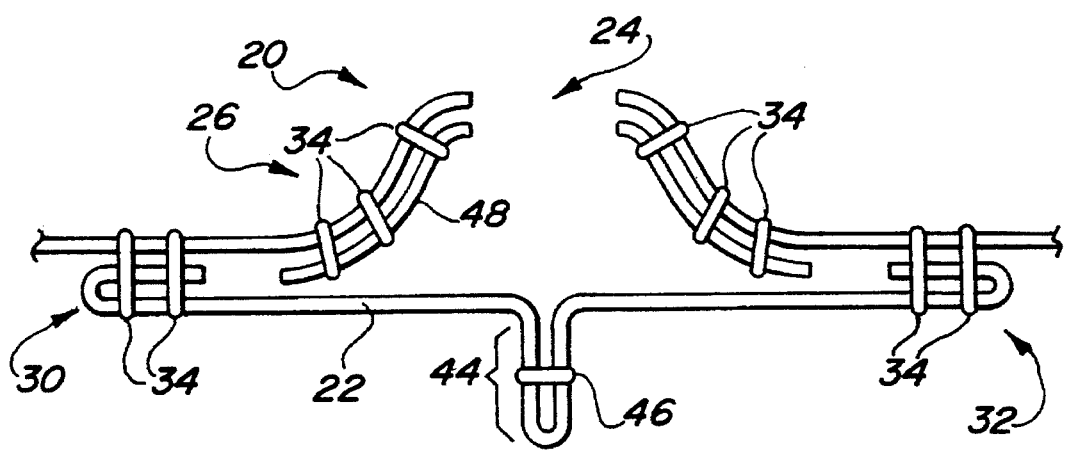
FIG. 3 is a cross-sectional view taken along line 3—3 of FIG. 1.

As shown in FIGS. 1–3, the gas flow-regulating valve 20 of this invention is provided in an air cushion such as a driver's side air bag by stitching an inner membrane 22, namely a rectangular patch, to the inside of bag 18 directly beneath an aspiration aperture, or vent, 24 in a manner which produces a longitudinal pucker 26 in an outer membrane 28 used to construct the air bag. Alternatively, outer membrane 28 can form an enlarged receiving hole (not shown), and a separate complementary piece of outer membrane which contains the pucker and forms the valve is then sewn into the hole, which allows for pre-assembly of the valve before it is sewn to a bag.

A further alternative variation can be provided by forming outer membrane 28 from a separate disk of fabric which is sewn into a hole (not shown) formed in outer membrane 28 such that the outer membrane can be constructed from a gas permeable fabric having flow apertures between the weft and warp threads wherein the gas flow rate therethrough can be reduced or eliminated by extension of the inner membrane 22 which is preferably gas impermeable. By extending the inner membrane into contact with the outer membrane, flow through the outer membrane is reduced or eliminated. Likewise, outer membrane 28 can be provided with a plurality of vents 24 which are formed in various locations of pucker 26 and the inner membrane can be formed from a stretchable rubber material which sequentially blocks the vents in a controlled manner in relation to the degree with which the inner membrane is stretched. Hence, flow is reduced through the vents in a controlled manner, preferably in the version as depicted in FIG. 4.

Inner membrane 22 is preferably stitched along a pair of opposed sewn edges 30 and 32 by a double row of stitches 34. A pair of free edges 36 and 38 are provided perpendicular to the stitched edges which form gaps 40 and 42 between the inner and outer membranes along free edges 36 and 38 due to extension of the longitudinal pucker 26 past each edge 36 and 38. The inner and outer membranes are formed from portions of sealed fabric having substantially identical surface distances between their stitched edges 32 and 34. Alternatively, an uncoated fabric can be used which requires heat sealing of the edges to prevent fabric unraveling. However, inner membrane 22 has a central pinched-off portion 44 which receives load releasable stitches 46 along a line parallel to sewn edges 30 and 32. As a result, in its sewn and assembled configuration, outer membrane 28 has an enlarged surface dimension with respect to inner membrane 22 between edges 32 and 34 which forms the longitudinal pucker 26 therebetween. Vent 24 is further supported and enforced with a circumferential reinforcing patch 48 preferably constructed of the same fabric used to form the inner and outer membranes. The reinforcing patch 48 is preferably sewn to the outer membrane 28 about the vent 24 with three circumferential rows of stitches 36 which retains the patch to the outer membrane and further prevents rupture of the vent under load.

Figure 5:
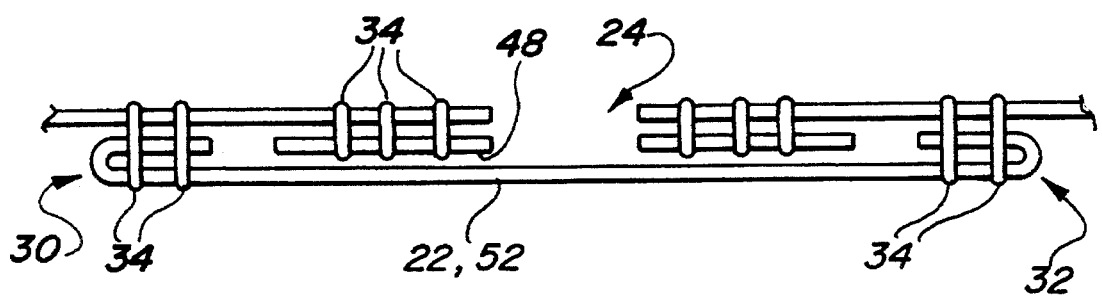
FIG. 5 is a cross-sectional view of the flow regulating valve of FIGS. 3 and 4 depicting the valve in an extended and pressure closed state.

Under low energy impacts, valve 20 is designed to ventilate inflation gases from the bag 18. Inflation gases within the air bag enter longitudinal pucker 26 adjacent free edges 36 and 38 of inner membrane 22 from which they are expelled through vent 24 into the passenger compartment 10. For example, a small occupant or slow speed crash will produce a lower energy impact such that the load releasable stitches 46 maintain pinched off portion 44 along the inner membrane 22, which outwardly biases outer membrane 22 to form pucker 26 and allows gases to flow from within the bag through the vent 24 via gaps 40 and 42. However, at a preselected level of stress on the air bag outer membrane 28 resulting from internal inflation pressure, stitches 46 are ruptured and inner membrane 22 extends in response to the impact induced internal pressure such that the inner and outer membranes are brought together into nested engagement which eliminates the pucker 26 and restricts flow through the vent 24, as shown in FIG. 5.

Figure 4:
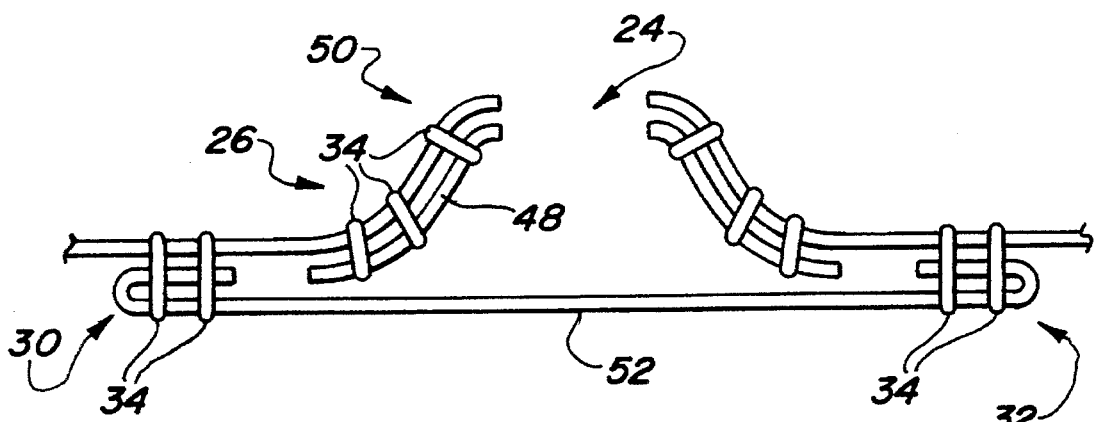
FIG. 4 is a cross-sectional view of an alternative embodiment of the flow regulating valve of FIGS. 1–3 corresponding to that shown in FIG. 3.

FIG. 4 depicts an alternative construction for a gas flow-regulating valve 50 of this invention wherein an elastic inner membrane 52 is constructed from a sheet of rubber, or elastic fabric. With this design, an inner membrane 52 is provided which is resilient and extensible and which stretches such that the volume of pucker 26 varies which restricts flow through vent 50 between a fully open and fully closed position. By tailoring the stiffness of the rubber inner membrane 52, flow through vent 50 can be tailored.

FIG. 2 depicts a driver's side air bag incorporating the gas flow-regulating valve 20 of FIG. 3, along with a standard air bag vent 54 having a sewn circumferential reinforcing patch 56. Alternatively, the gas flow-regulating valve 50 of FIG. 4 can be substituted for valve 20. The bag 18 has a mounting opening 52 in conjunction with a circumferential mouth reinforcement 58 formed from fabric which is sewn to the bag's flexible outer membrane 28 which provides inflator mounting holes 60 for mounting to an air bag inflator and base plate (not shown).

In operation, the load releasable stitches 46 of valve 20 are provided with an appropriate spacing and strength to retain inner membrane 22 in a shortened configuration between sewn edges 30 and 32 while an air bag is inflating and when the air bag is subjected to lower level energy loads which are below a triggering threshold pressure. For example, inflation of an air bag by a pyrotechnic inflator will quickly fill the bag with inflation gases such that stitches 46 remain in position, forming and maintaining longitudinal pucker 26 which provides for expulsion of exhaust gases while the bag is inflating, as well as while the bag is deflating during impact from an occupant. The stitches 46 are tested to achieve an appropriate spacing and strength such that an impact with a smaller sized occupant, or, with a larger occupant moving at a low velocity, does not rupture the stitches either while the bag is inflating, or while it is deflating, such that valve 20 continuously expels inflation gases through vent 24.

In the case of a large occupant or during a severe crash where an occupant moves at a high velocity towards the air bag 18, higher impact energies are exerted on the air bag 18, and valve 20 is designed to close in response to the rupture of stitches 46 due to the air bag internal pressure exceeding a threshold valve in response to impact forces applied to the air bag outer membrane 28. In a vehicle crash, a primary collision occurs between the vehicle and an external object, typically another vehicle. A secondary collision occurs between the occupant and the interior of the vehicle, and in the case of an air bag, the occupant interacts with the air bag to dissipate impact energies of the occupant with respect to the vehicle's interior. Furthermore, a steering column 16 is usually provided with an energy absorbing component which further dissipates occupant impact energies with the bag. Preferably, the bag should expel inflation gases during occupant impact in order to maximally compress the bag which increases adsorption of the occupant's energy while still preventing the occupant from contacting the steering column. Any energy absorbed by compression of the air bag 18 supplements energy absorption provided by the steering column and its support, for example energy absorbing stroking steering columns which are commonly used with driver side air bags. The air bag provides a compliant surface which distributes impact load between the occupant and column as the occupant is decelerated during a crash, and which subsequently affects the occupant's kinematics during a vehicle crash.

In operation, it is undesirable for the air bag 18 to fully compress, or bottom-out. If vents 24 and 54 in combination exhaust too much inflation gas from an air bag, the bag will bottom out and the fully compressed air bag will allow the occupant to contact the steering column 16 which might contribute to occupant injury. For example, an air bag which is overly vented might be fully compressed by a large occupant, particularly under high velocity and large energy impacts. As a result, the occupant might see increased chest and rib cage injuries, as well as head injuries. Alternatively, by designing the vents of this invention in an air bag to appropriately close valve 20, the air bag 18 stiffens when a large occupant or a higher energy impact loads the air bag, but remains open to soften the air bag when a small occupant loads the air bag. For example, a six year old child occupant under a light energy or small velocity impact will not close valve 20. Only by providing a variable flow valve can one air bag be presented to various sized occupants under varying impact energy conditions.

A further additional problem is created when an air bag bottoms out because impact loads which transfer to the steering column and its support structure suddenly increase when the occupant bottoms out the bag which directly loads the column and which can seriously affect operation of any energy absorbing mechanism built into the column. Typically, a steering column absorbs energy by provision of a stroking energy absorbing mechanism within the column. When an occupant suddenly bottoms out the bag and contacts the steering column, the loads to the column significantly increase, and typically bending loads transfer to the steering column since the occupant typically impacts the air bag and column along an off-axis direction. Such an impact suddenly increases the out of plane bending moments on the column which can bind up the energy absorbing mechanism within a column. If the out of plane bending moments are excessive, the column may revert from a stroking mode into a bending mode which can completely fail the steering column support structure and rotate the column and air bag, and produce a deleterious effect to occupant kinematics within the vehicle during a crash By appropriately tailoring the strength and spacing of stitches 46 on inner membrane 22, the central pinched off portion 44 is ruptured as the threads break at a predetermined load which produces extension of the inner membrane and which produces flattening and straightening of longitudinal pucker 26 in the outer membrane such that inner and outer membranes are nested together to block flow through vent 24. Preferably, the inner membrane is formed from a gas impermeable membrane, for example, a coated fabric. Alternatively, the inner membrane can be formed from an uncoated fabric which provides air flow apertures between the weft and warp threads for controllably providing a reduced air flow through the inner membrane and out the vent 24 following elimination of pucker 26. In such a system, the valve 20 restricts, but does not eliminate, flow through vent 24 after a threshold load breaks stitches 46.

Figure 6:
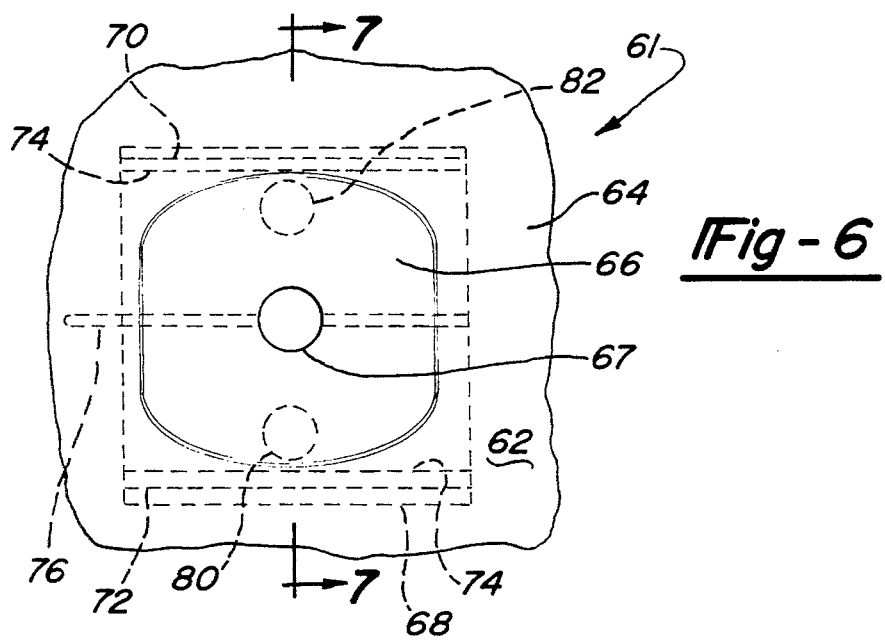
FIG. 6 is a partial perspective view of an alternative embodiment according to this invention providing a preformed outer membrane pucker and a vented inner membrane.
Figure 7:
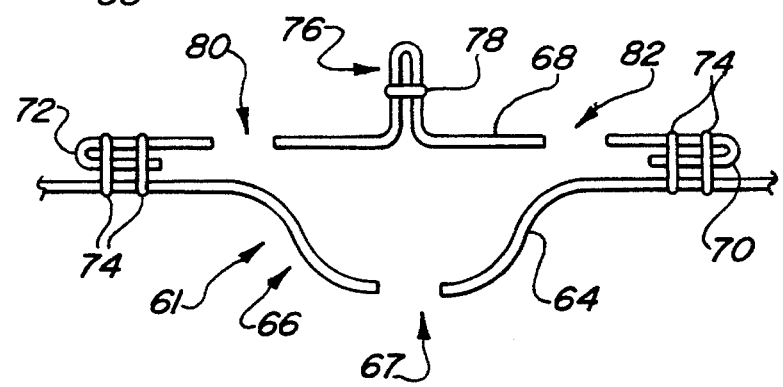
FIG. 7 is a cross-sectional view taken along line 7—7 of FIG. 6.

FIGS. 6 and 7 depict another alternative variation for the gas flow regulating valve 20 shown in FIGS. 1–3 wherein an air bag 62 is provided with a gas flow-regulating valve 64, in place of valve 20, having a pucker 66 with a vent 67 which is integrally formed in the air bag's flexible outer membrane 66 in the shape of an annular raised surface. Inner membrane 68 is retained within the outer membrane along sewn edges 70 and 72 by stitches 74 which retain the inner membrane to the air bag membrane 66 in such a manner similar to that depicted in FIGS. 1–3. However, in this version the inner membrane extends beyond the pucker 66, eliminating any gaps 40 and 42 as shown in FIGS. 1–3. Therefore, vents 80 and 82 must be provided in inner membrane 68 to expel inflation gases into the membrane gap formed by the pucker 66. Vents 80 and 82 are preferably radially outwardly spaced in relation to vent 67 to assure closure of the valve under severe pressures. In this version, inner membrane 68 is formed from rubber, and high internal air bag pressures create high loads on the inner membrane which stretch the membrane into the annular pucker 66 which seals up vent 67, as well as vents 80 and 82.

Alternatively, an elastic inner membrane can be substituted for inner membrane 68 which is similar to the membrane 52 depicted in FIG. 4. In this case, a plurality of vents similar to vents 80 and 82 are provided in the inner membrane in locations radially spaced apart from the location of vent 67 such that elastic extension of the inner membrane progressively closes the radially outwardmost positioned vents as the inner membrane elastically stretches into the pucker 66. Such a valve system allows for regulated decreasing restriction of the exhaust flow through vent 67 as the inner membrane stretches and approaches a nested contact with the pucker 66 formed by the outer membrane 64.

Figure 8:
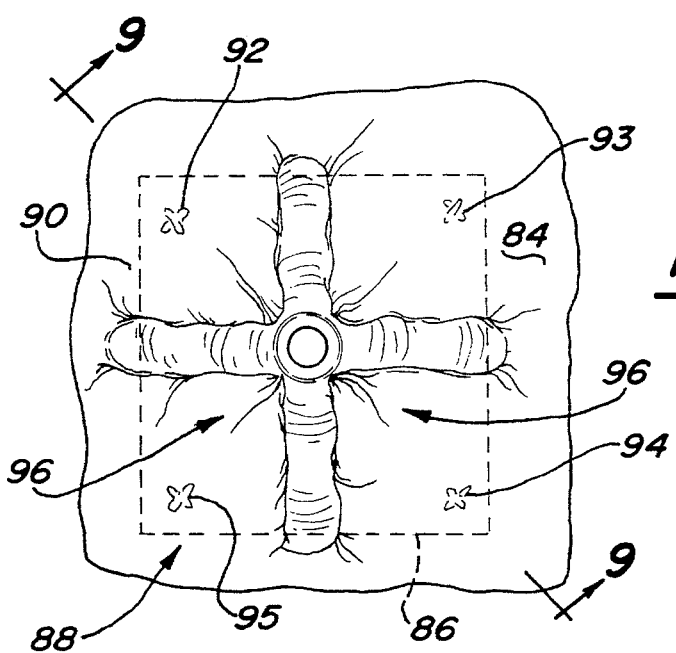
FIG. 8 is a partial perspective view of an alternative embodiment according to this invention providing an extensible elastic inner membrane which is secured at four corners to an outer membrane in an enshortened configuration which creates a pucker.
Figure 9:
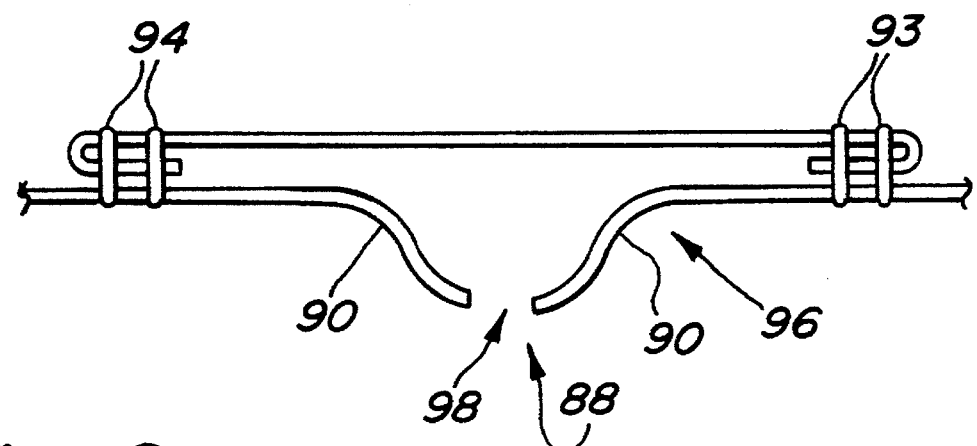
FIG. 9 is a cross-sectional view taken along line 9—9 of FIG. 8.

FIGS. 8 and 9 disclose a further variation of the valve 20 provided on an air bag 76 wherein an extensible inner membrane 86 is provided in a gas flow-regulating valve 88 which is extensible under load, either by rupture of stitches, or by construction with an elastic material which is extensible such as rubber. As shown in FIGS. 8 and 9, an elastic rubber inner membrane 86 is stitched to an outer membrane 90 forming the air bag. A plurality of stitches 92–95 retain the inner membrane to the outer membrane such that a star shaped pucker 96 is formed in the outer membrane by joining the inner membrane to the outer membrane such that the surface length of the inner membrane is shorter than the outer membrane between stitches in the two planar directions of each membrane which puckers the outer membrane material when stitched together. Under load, inner membrane 86 stretches which seals the inner membrane with the outer membrane to restrict or eliminate flow through vent 98.

It is to be understood that the invention is not limited to the exact construction illustrated and described above, but that various changes and modifications may be made without departing from the spirit and scope of the invention as defined in the following claims.

What is claimed is:

1. An improved air cushion restraint system for a motor vehicle occupant with provision for mounting to a pressurized gas source for inflation thereof, the system comprising:

an air bag formed from a flexible membrane having an inflation chamber engageable in fluid communication with the pressurized gas source, and a gas flow-regulating valve comprising:

an outer membrane portion provided in said air bag membrane, said outer membrane portion having at least one aspiration aperture;

an inner membrane portion provided beneath said outer membrane portion about spaced apart locations substantially proximately spanning said aperture, said outer membrane portion being larger than said inner membrane portion as measured in at least one direction such that a pucker is formed between said inner and outer membrane portions while joined together in a reduced stress membrane state;

a gas flow path providing fluid communication between the inflation chamber and said pucker for directing inflation gases from the inflation chamber past said inner membrane and into said pucker for expulsion through said aspiration aperture; and means for extending said inner membrane portion in response to a threshold impact energy imparted to said air bag which increases gas pressure in the inflation chamber to increase the size of said inner membrane as measured in said at least one direction so that said inner and outer membranes are brought together in nested engagement so as to dissipate said pucker and flow restrict said aperture.

2. An improved air cushion restraint system of claim 1 wherein said inner membrane portion is affixed to said outer membrane portion about spaced apart locations and said inner membrane portion is formed from a generally inextensible material having a pinched off portion formed with a series of load severable stitches to shorten said inner membrane in relation to said outer membrane portion between at least two of said spaced apart locations to define said pucker.

3. The improved air cushion restraint system of claim 1 wherein said inner membrane portion is a sheet of rubber material which is extensible under load.

4. The improved air cushion restraint system of claim 3 wherein said rubber inner membrane portion is affixed to said outer membrane portion about said plurality of spaced apart locations with stitches extending along locations of connection.

5. The improved air cushion restraint system of claim 1 wherein said aspiration aperture comprises a vent provided in said outer membrane portion.

6. The improved air cushion restraint system of claim 1 wherein said at least one aspiration aperture comprises a gas permeable membrane which forms at least a portion of said outer membrane portion.

7. The improved air cushion restraint system of claim 1 wherein said outer membrane portion is integrally formed from said air bag flexible membrane.

8. The improved air cushion restraint system of claim 1 wherein said outer membrane portion having said at least one aspiration aperture is formed from a separate piece of membrane material which is sewn into an opening in said air bag flexible membrane such that said gas flow-regulating valve can be preassembled with said separate piece of membrane material prior to sewing of said outer membrane portion to said air bag flexible membrane.

9. The improved air cushion restraint system of claim 1 wherein said outer membrane is a woven fabric material comprising a plurality of weft and warp threads which provide said aspiration apertures therebetween.

10. The improved air cushion restraint system of claim 1 wherein said inner membrane portion is a woven fabric material comprising a plurality of weft and warp threads.

11. The improved air cushion restraint system of claim 10 wherein said woven fabric material is sealed so as to be gas impermeable.

12. The improved air cushion restraint system of claim 2 wherein said load severable stitches provide a pinched off energy absorbing loop such that said stitches break at a predetermined inner membrane load which provides extension of said inner membrane and eliminates said pucker, restricting flow through said aspiration aperture.

13. The improved air cushion restraint system of claim 1 wherein said gas flow path is provided by said outer membrane forming said pucker such that said pucker extends beyond said inner membrane to define said gas flow path.

14. An improved air cushion restraint system for a motor vehicle occupant with provision for mounting to a pressurized gas source for inflation thereof, the system comprising:

an air bag formed from a flexible membrane having an inflation chamber engageable in fluid communication with the pressurized gas source, and a gas flow-regulating valve comprising:

an outer membrane portion provided in said air bag membrane, said outer membrane portion having at least one aspiration aperture;

an inner membrane portion provided beneath said outer membrane portion in communication with said inflation chamber, said outer membrane portion being larger than said inner membrane portion as measured in at least one direction, said inner membrane portion affixed to said outer membrane portion along at least one location such that a pucker is formed between said inner and outer membrane portions while joined together in a reduced stress membrane state;

a gas flow path providing fluid communication between the inflation chamber and said pucker directing gas from said inflation chamber past said inner membrane and into said pucker for expulsion through said aperture; and means for extending said inner membrane portion in response to said air bag internal pressure exceeding a threshold value such that said valve brings together said inner and outer membranes in nested engagement so as to dissipate said pucker and flow restrict said aperture.

15. The improved air cushion restraint system of claim 14 wherein said pucker is pre-formed in said air bag outer membrane portion.

16. An improved air bag gas flow-regulating valve for use in an air bag formed from a flexible membrane having an inflation chamber engageable in fluid communication with a pressurized gas source for inflation thereof, the improvement comprising:

an outer membrane portion for contiguous edge communication with an air bag membrane, said outer membrane portion having at least one aspiration aperture;

an inner membrane portion provided beneath said outer membrane portion for communication with the air bag inflation chamber;

said outer membrane portion being larger than said inner membrane portion as measured in at least one direction such that a pucker is formed by said outer membrane portion in relation with said inner membrane portion having at least one aspiration aperture;

a gas flow path providing fluid communication between the inflation chamber and said pucker for directing inflation gases from the inflation chamber past said inner membrane and into said pucker for expulsion through said aspiration aperture; and means for extending said inner membrane portion in response to a threshold pressure within the inflation chamber resulting from occupant impact energy imparted to said air bag such that said inner and outer membranes are brought together in nested engagement so as to flow restrict said aperture.

17. The improved air bag gas flow-regulating valve of claim 16 wherein said outer membrane portion is formed from the air bag flexible membrane.

18. The improved air bag gas flow-regulating valve of claim 16 wherein said outer membrane portion is formed from a first flexible membrane which is sewn into a receiving hole formed in the air bag flexible membrane where it is joined with stitches which allows pre-assembly of the air bag gas flow-regulating valve prior to mounting on an air bag.

* * * * *